G. P. THOMAS.
SPACING MACHINE.
APPLICATION FILED MAR. 30, 1908.

908,819.

Patented Jan. 5, 1909.
5 SHEETS—SHEET 3.

WITNESSES:
J. Herbert Bradley.
Francis J. Tomasson

INVENTOR
George Paul Thomas
by Christy and Christy
Attys.

G. P. THOMAS.
SPACING MACHINE.
APPLICATION FILED MAR. 30, 1908.
908,819.
Patented Jan. 5, 1909.
5 SHEETS—SHEET 4.
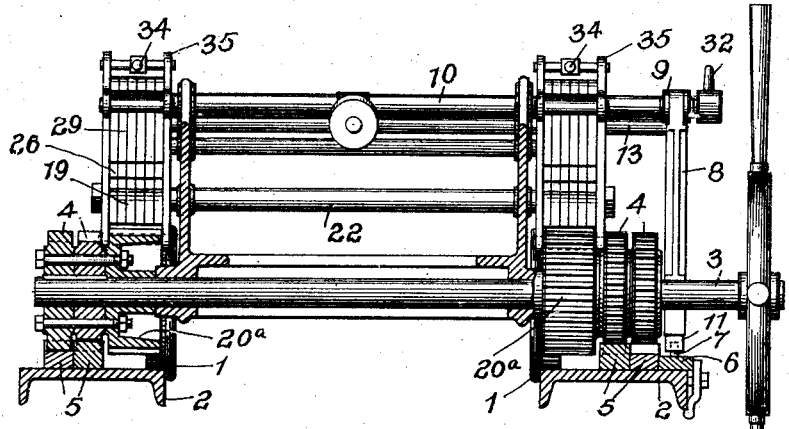
FIG. 5.
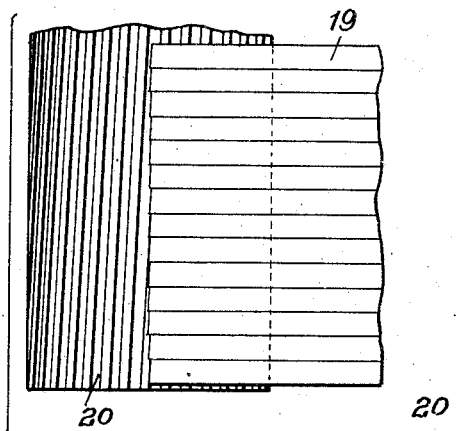
FIG. 6.
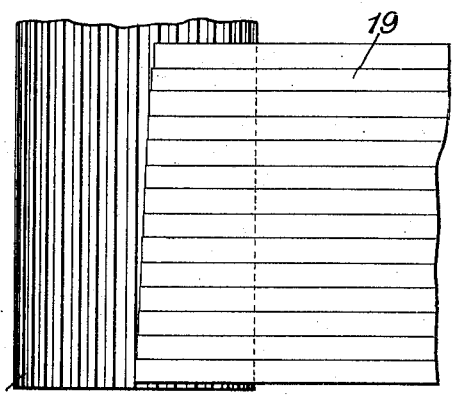
FIG. 7.
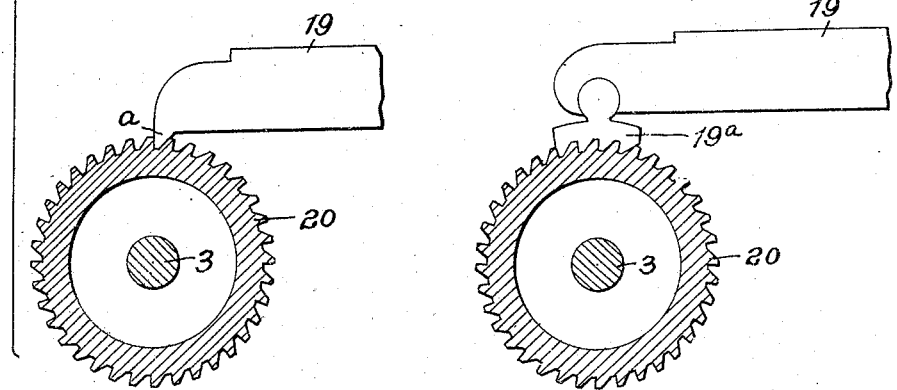
FIG. 7.ᵃ
WITNESSES:
INVENTOR
George Paul Thomas
by Christy and Christy,
Atty's.

G. P. THOMAS.
SPACING MACHINE.
APPLICATION FILED MAR. 30, 1908.

908,819.

Patented Jan. 5, 1909.

5 SHEETS—SHEET 5.

WITNESSES:
J. Herbert Bradley
Francis J. Tomasson

INVENTOR
George Paul Thomas
by Christy and Christy
Att'ys.

UNITED STATES PATENT OFFICE.

GEORGE PAUL THOMAS, OF PITTSBURG, PENNSYLVANIA.

SPACING-MACHINE.

No. 908,819.　　　　　Specification of Letters Patent.　　　Patented Jan. 5, 1909.

Application filed March 30, 1908. Serial No. 424,093.

*To all whom it may concern:*

Be it known that I, GEORGE PAUL THOMAS, residing at Pittsburg, in the county of Allegheny and State of Pennsylvania, a citizen of the United States, have invented or discovered certain new and useful Improvements in Spacing - Machines, of which improvements the following is a specification.

In Letters Patent No. 835,123, dated November 6th, 1906, and No. 886,551, dated May 5, 1908, and application Ser. No. 415,692, dated February 13th, 1908, I have described and claimed certain improvements in mechanism for feeding plates, etc., to machines for punching or otherwise operating on such articles, the movements of the feed mechanism and article moved thereby being controlled by a templet. The means employed for arresting the movement of such feed mechanism includes a series of detents adapted to engage teeth secured to the rails or supports along which the feed mechanism travels, the detents being staggered. The manufacture of the toothed portions or bars with which the detents engage is very considerable as they should have a length equal to that of the longest article to be operated on, and as the toothed bar is limited in width for structural reasons, thus limiting the number of detents employed, the toothed bar should have its teeth closely adjacent and carefully spaced, thus increasing the expense of manufacture.

The invention described herein has for its object a construction in which an endless toothed portion is mounted on the carriage of the feed mechanism and is moved with reference to the detents by the carriage shifting mechanism. It is a further object of the invention to provide a construction in which the detents have their engaging portions in a common plane and the teeth with which the detents engage in planes at an angle to the common plane of the detents.

Figure 1:
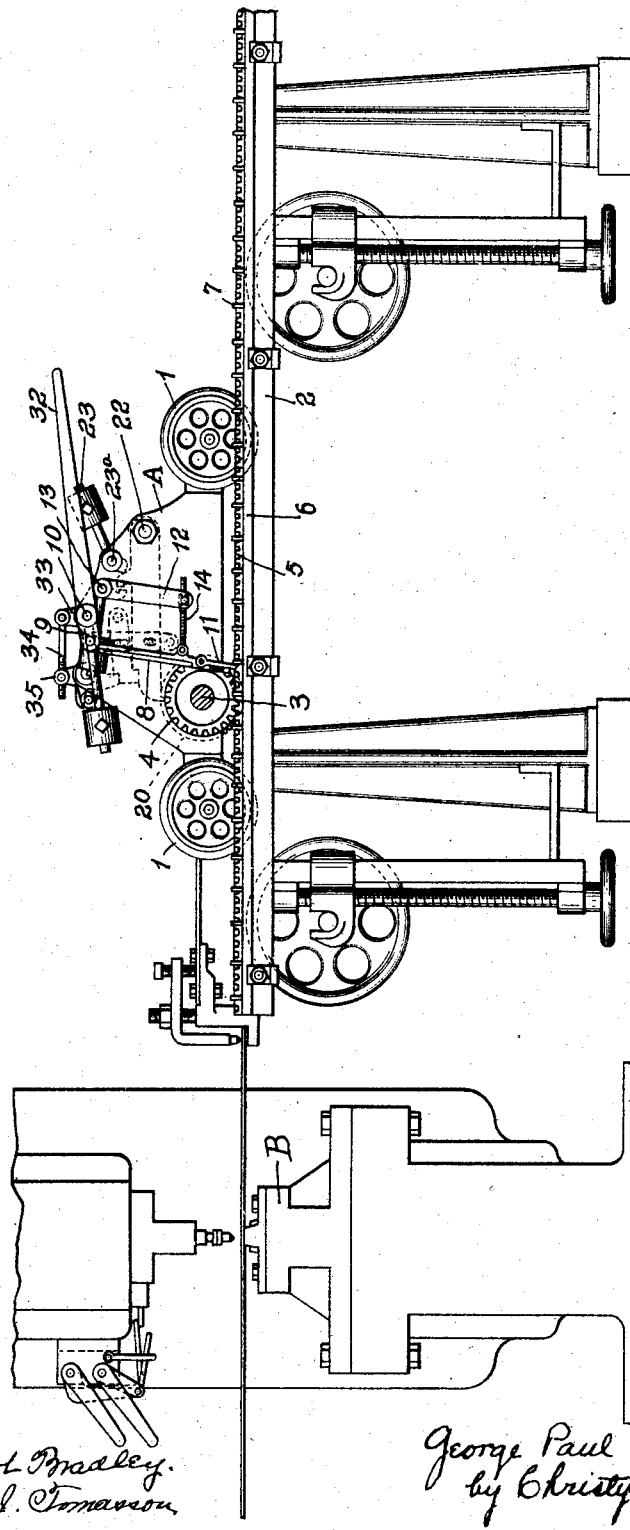
Figure 2:
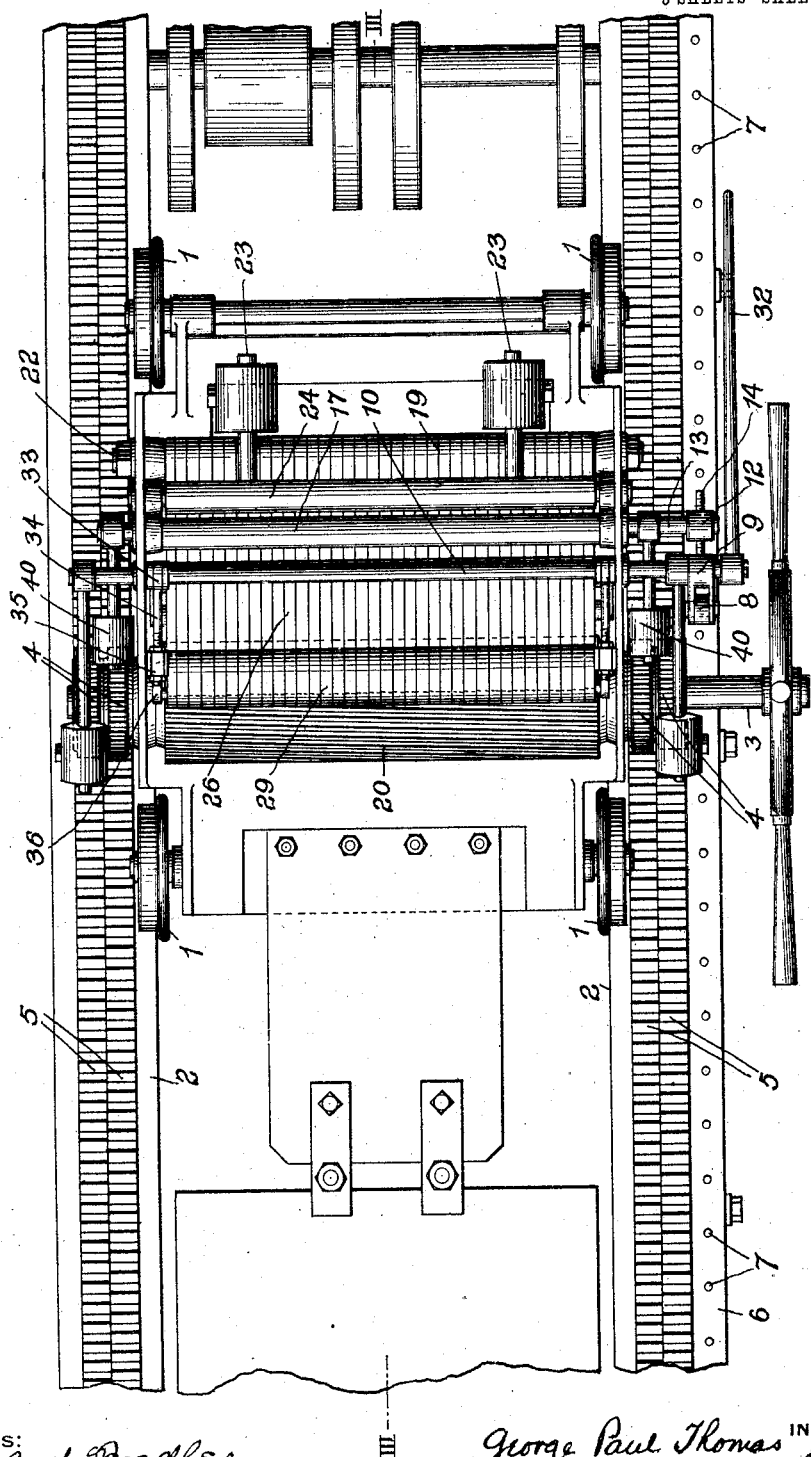
Figure 3:
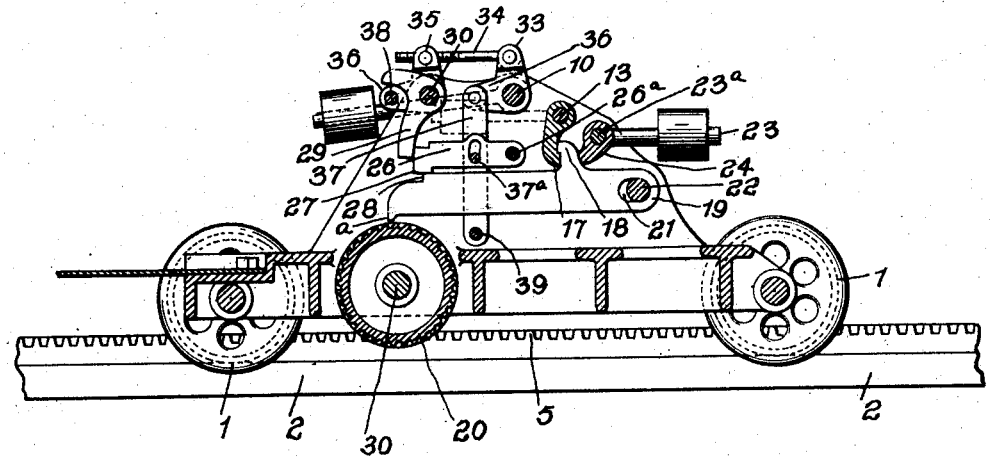
Figure 4:
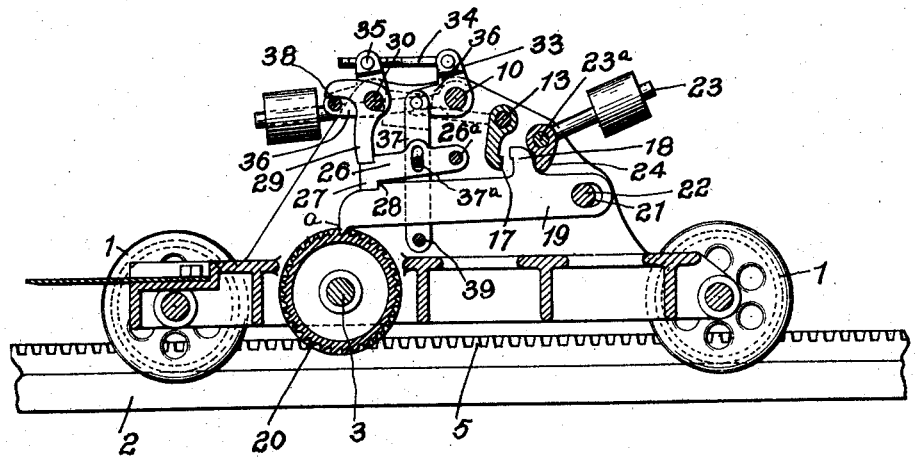
Figure 8:
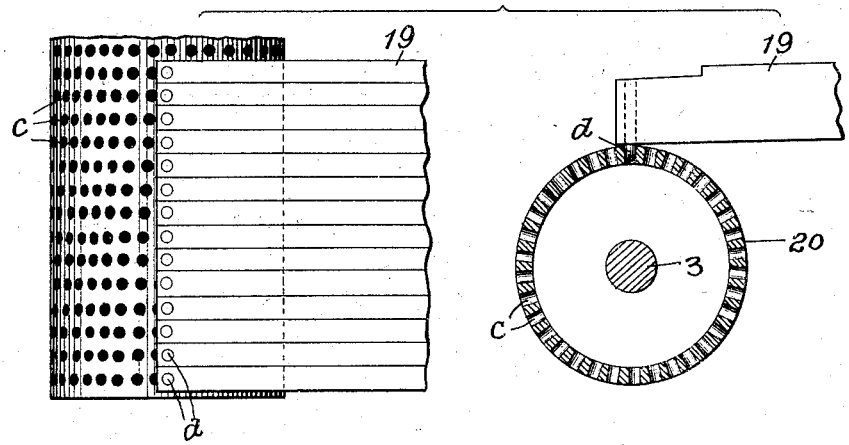
Figure 9:
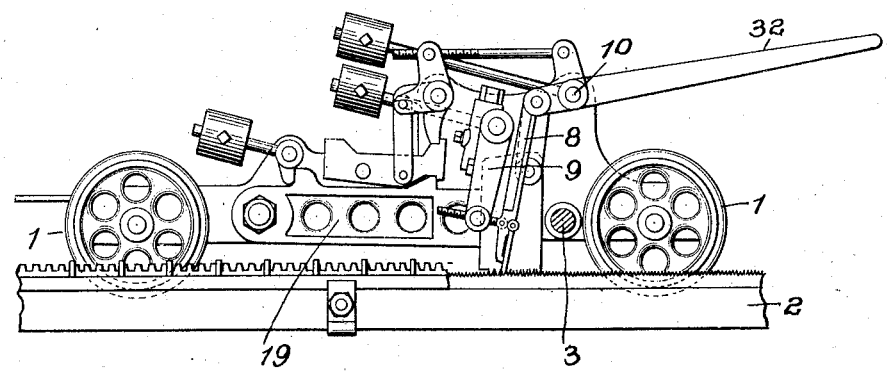
Figure 10:
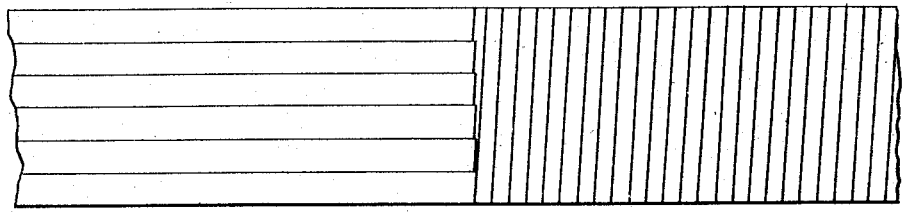

In the accompanying drawings forming a part of this specification Figure 1 is a side elevation of my improved feed mechanism shown in connection with a power punch; Fig. 2 is a top plan view of the feed mechanism, on an enlarged scale; Figs. 3 and 4 are sectional elevations on a plane indicated by the line III—III Fig. 2, showing the parts in unlocked and locked positions respectively; Fig. 5 is a view partly in front elevation and partly in section of a modified form of the feed mechanism; Fig. 6 shows in plan and section the toothed cylinders and detents of Fig. 1 on an enlarged scale; Fig. 7 shows views similar to those of Fig. 6 illustrating modifications in the construction of the toothed cylinder and detents; Fig. 7ª shows in section a toothed cylinder in connection with a modified form of detent; Fig. 8 shows in plan and section further modifications of the cylinder and detents; Fig. 9 is a side elevation illustrating a modification of the construction of the feed mechanism set forth in application Ser. No. 415,692, and Fig. 10 is a plan view of the toothed bar and detents shown in Fig. 9.

As shown in Letters Patent No. 855,123 and No. 886,551, the work carrier consists of two carriages movable on tracks arranged on opposite sides of the tool B, which may be a punch, shear or other metal working tool. One of the carriages (not shown herein) is connected to one end of the article being operated on and partakes of the movements imparted to the article by the driving and controlling carriage A connected to the opposite end of the article. The frame of carriage is supported by wheels 1 arranged on the rails 2 along which the carriage is shifted by a hand or power driven shaft 3 having pinions 4 keyed thereon and intermeshing with racks 5 parallel with the rails 2.

It will be readily understood by those skilled in the art that my improvement can be used in connection with metal working tools other than punches although the improvements are shown for convenience in connection with a power punch.

The movement of the carriage is controlled by a templet consisting of a bar 6 secured parallel with the rails 2 along which the carriage moves, and provided with suitable stops as pins 7 spaced in accordance with the desired spacing of the holes to be punched in the sheet or other article. These pins project into the path of movement of a trip finger 8 pivotally connected to an arm 9 on the shaft 10, which is mounted in suitable bearings in the side plates of the carriage. The finger is preferably provided with a paddle 11 pivotally mounted on the finger in such manner that when the carriage is moved in one direction the finger will be shifted by the engagement of the paddle with the pins or stops, but the paddle will swing on its pivotal support and pass over the pins without shifting the finger, when the carriage is moved in the opposite direction. The finger 8 is connected by a threaded rod 14 to an arm 12 on the shaft 13 to which the catch 17 in also secured, so that on the rotation of the shaft by the finger 8, the catch will be shifted out of engagement with shoulders 18 on the detents 19. In the construction shown in Figs. 1 to 4, the detents 19 are arranged between the side plates of the carriage and pivotally mounted on the shaft 22 also secured to the side plates of the carriage. These detents are provided at their free ends with projections or teeth $a$ adapted to engage teeth or depressions on the cylinder 20, which is keyed to the carriage shifting shaft 3, so that the cylinder will rotate in unison with the gear wheels 4 when rotated to shift the carriage. When the fingers 8 are shifted by the templet pins, the catch 17 will also be turned out of engagement with the detents 19 which will then drop onto the toothed cylinder and one or more of the detents will engage the teeth on the cylinder thereby preventing any further rotation of the cylinder and movement of the carriage except a small predetermined movement provided for the purpose of preventing shocks incident to a sudden stoppage of the cariage. A convenient construction whereby a gradual stoppage of the carriage is obtained, consists in slotting the detents as at 21, so that they may move longitudinally on their pivotal shaft 22, after engagement with the cylinder. This longitudinal movement is yieldingly resisted as by a weight or other suitable means. In the construction shown weighted arms 23 are secured to shafts $23^a$ mounted on the carriage and provided with a toe 24 bearing against portions of the detents, as the shoulders 18, as clearly shown in Figs. 3 and 4. These weights will shift the detents, when they are out of engagement with the cylinders, until the rear ends of the slots 21 bear against the shaft 22, as shown in Fig. 3. When the detents are dropped and one or more engage the cylinder, the movement of the carriage will cause the detents to move back, thereby raising the weighted levers, which will thus exert a retarding effect on the cylinder and through the shaft 3 and pinions 4, a like effect on the carriage. Means are provided to prevent any rebound or movement of the carriage in reverse directions when its feed movement has been checked. A suitable means consists of pawls 26 one for each detent, pivotally mounted on a shaft $26^a$ and provided at their free ends with projections 27 adapted to engage shoulders 28 on the detents. These pawls normally rest on the detents, and when the latter have been shifted by the cylinder, as described, the pawls will drop down and the projections on the pawl will engage the shoulder 28 on the detents. As the front wall of the slot 21 bears against the shaft 22, and as the projection 27 engages the shoulder 28, the detent in engagement with the cylinder, is firmly locked as against movement relative to the carriage, and as the detent is in engagement with the cylinder on the carriage-driving shaft, the carriage is securely locked as against movement in either direction, as shown in Fig. 4. It is preferred to employ common means for holding the detents in engagement with the cylinder and the pawls in engagement with the detents, such means consisting of triggers 29 pivotally mounted on a shaft 30 mounted in suitable bearings in the side plates of the carriage. These triggers normally rest against the ends of the pawls, and when the latter drop down to engage the detents, the triggers will swing over the pawls, thereby locking the latter and the detents in carriage-locking position.

The release movements of the finger 8, the catch 17, the trigger 29, pawls 26 and detents 19 are preferably effected by a single lever or handle 32 secured to the shaft 10. By depressing the lever or handle, the shaft 10 is rotated to raise the fingers 8 above the pins 7. Arms 33 on the shaft 10 are connected by rods 34 to arms 35 in shaft 30, said arms being provided with lugs 36 to which are connected links 37. These links are connected to pawls 26 by a rod $37^a$ passing through slots in the pawls and having its ends secured to the links. A rod 39 passing below the detents is also secured to the links, as shown in Figs. 3 and 4. The lugs 36 on opposite sides of the machine are connected by a rod 38 passing below angular extensions of the triggers 29. By the rotation of the shaft 10, whereby the finger 8 is raised the shaft 30 is also rotated thereby first shifting the triggers 29 from engagement with the pawls, then raising the pawls from the detents and finally lifting the detents from the cylinder. As soon as the detents are raised they will be shifted forward to normal position, shown in Fig. 3 by the weighted lever 23, and the catch 17 will be swung into engagement with the detents to hold them in normal position, by the weight 40 on the shaft 13. By this movement of the shaft 13 the arm 18 is also moved to shift the finger 8 back of the pin 7 with which it was in engagement. As soon as the detents have been locked in normal position, the lever or handle 32 is released thus permitting the unlocking devices to return to normal position, when the carriage can be again shifted by power applied to the shaft 3.

In the Letters Patent and application referred to, and as shown in Fig. 7, the teeth or projections $a$ on the several detents may be so arranged that a plane passing through the teeth of all the detents will be at an angle less than a right angle to the direction of movement of the carriage, while the teeth with which the detents engage are in planes substantially at right angles to the direction of movement of the carriage. This construction can be readily reversed as shown in Figs. 2, 6 and 9 and 10, and the teeth on all the detents arranged in a plane at right angles to the line of movement of the carriage and the teeth with which the detents engage, e. g. the teeth on the cylinder 20 arranged in planes at an angle less than a right angle to the movement of the carriage.

In the construction set forth in the Letters Patent and application referred to and also shown in Figs. 9 and 10, the series of teeth with which the detents engage are arranged on the carriage support and extend a distance equal to the greatest desired travel of the carriage. These teeth are expensive to manufacture and as they are limited in width for structural reasons only a few detents can be employed, so that to attain accuracy in the operation of the machine the teeth must be placed closely adjacent to each other. By the employment of a toothed cylinder in lieu of a line of teeth on the carriage support a long series of teeth is avoided. And further by arranging the cylinder between the side plates of the machine, it can be made of a considerable length permitting the use of a large number of detents and consequently larger teeth with a greater spacing.

As shown in Figs. 2 and 6 the teeth on the cylinder may be at an angle less than a right angle to the line of movement of the carriage and the teeth on the detents in a common plane at right angles to such line of movement; or such arrangement may be reversed as shown in Fig. 7.

As shown in Fig. 7$^a$ the projections or teeth for the detents may be formed on a block 19$^a$ movably mounted on the detent, thereby permitting of the use of two or more teeth or projections on each detent, as a block will automatically adjust itself to a position where all teeth will engage the cylinder at the same time.

As shown in Fig. 8, lines of holes or perforations c may be formed in the cylinder in lieu of the teeth and the detents provided with pins d adapted to engage the holes or perforations in the cylinder. It will be understood that the lines of holes or perforations may be at right angles or at angles less than right angles to the direction of movement of the carriage.

While single racks 5 and pinions 4 may be used for shifting the carriage, it is preferred to employ two pairs of racks and pinions, one pair on each side of the carriage. The members of each pair of racks and pinions have their teeth staggered or alternating with the teeth of the other member of the pair. This construction reduces lost motion to a minimum, a feature especially important where the stopping of the carriage is dependent upon the interlocking of the pinions with the racks.

In Figs. 9 and 10 is shown a construction of feed mechanism similar to that described and claimed in application Ser. No. 415,692, except as regards the detents and the teeth with which the detents engage to stop the carriage. In the said application the detents are staggered and the teeth on the supporting frame are at right angles to the line of movement of the carriage, while in the construction illustrated in Figs. 9 and 10, this construction is reversed.

In Figs. 1, 2, 3 and 4 the toothed cylinder, detents and their locking devices are shown as arranged between the side plates of the carriage. In lieu of such construction, two shorter cylinders 20$^a$ may be secured on the shaft 3 outside of the side plates of the carriage, as shown in Fig. 5. In such case detents and locking devices therefor are arranged outside of the side plates but provision is made whereby both sets of detents and their locking devices will operate simultaneously.

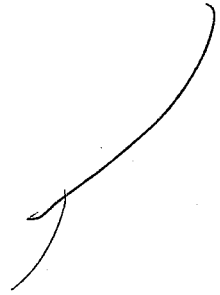

I claim herein as my invention:

1. In a spacing machine, the combination of a stationary member, a movable member, means mounted on the movable member and engaging the stationary member to shift the movable member, and means operative by the movement of the movable member for locking the shifting means and thereby lock the movable member as against movement relative to the stationary member.

2. In a spacing machine, the combination of a support, a carriage movable along said support, a rack secured to the support, a pinion mounted on the carriage and intermeshing with the rack, and means operative by the movement of the carriage for locking the pinion as against rotation.

3. In a spacing machine, the combination of a support, a carriage movable along the support, means mounted on the carriage and adapted to engage the support, a toothed or other cylinder mounted on the carriage and connected to the means engaging the support, and detents controlled by the movement of the carriage and adapted to lock the cylinder.

4. In a spacing machine, the combination of a support provided with a rack, a carriage movable along the support, a driving pinion mounted on the carriage and engaging the rack, a toothed cylinder connected to the pinion and detents mounted on the carriage and adapted to engage the cylinder, the detents being controlled by the movement of the carriage.

5. In a spacing machine, the combination of a support, a carriage movable along the support and a carriage stopping mechanism including a series of teeth at an angle less than a right angle to the direction of movement of the carriage, and a series of detents having the portions engaging the teeth in a plane forming an acute angle with the teeth.

6. In a spacing machine the combination of a support, a carriage movable along the support, mechanism for stopping the carriage including a rotatable cylinder bearing teeth formed longitudinally thereof, said teeth being at an angle less than a right angle to the direction of movement of the carriage, and a series of detents adapted to engage the cylinder and hold the same from rotation, the portions of the detents engaging the cylinder being in a plane forming an acute angle with the teeth on the cylinder.

7. In a spacing machine, the combination of a support provided with a rack, a carriage movable along the support, a driving pinion mounted on the carriage and engaging the rack, a toothed cylinder connected to the pinion, detents adapted to engage the cylinder and to be shifted thereby, a yielding means for holding the detents from movement by the cylinder, and means for locking the detents from movement relative to the carriage.

8. In a metal working machine, the combination of supporting rails, a carriage movable along said rails, a double rack secured to the rails, the teeth of one rack being staggered in respect to those of the other rack, and double pinions having their teeth similarly spaced or staggered, and means for rotating the pinions.

9. In a metal working machine, the combination of supporting rails, a carriage movable along said rails, a double rack secured to the rails, the teeth of one rack staggered in respect to those of the other rack, and double pinions having their teeth similarly staggered, means for rotating the pinions, and means controlled by the movement of the carriage for locking the pinions as against rotation.

In testimony whereof, I have hereunto set my hand.

GEORGE PAUL THOMAS.

Witnesses:
   CHARLES BARNETT,
   J. HERBERT BRADLEY.